Jan. 20, 1959     T. W. MERRITT ET AL     2,869,512
MILKER
Original Filed June 24, 1955     2 Sheets-Sheet 1
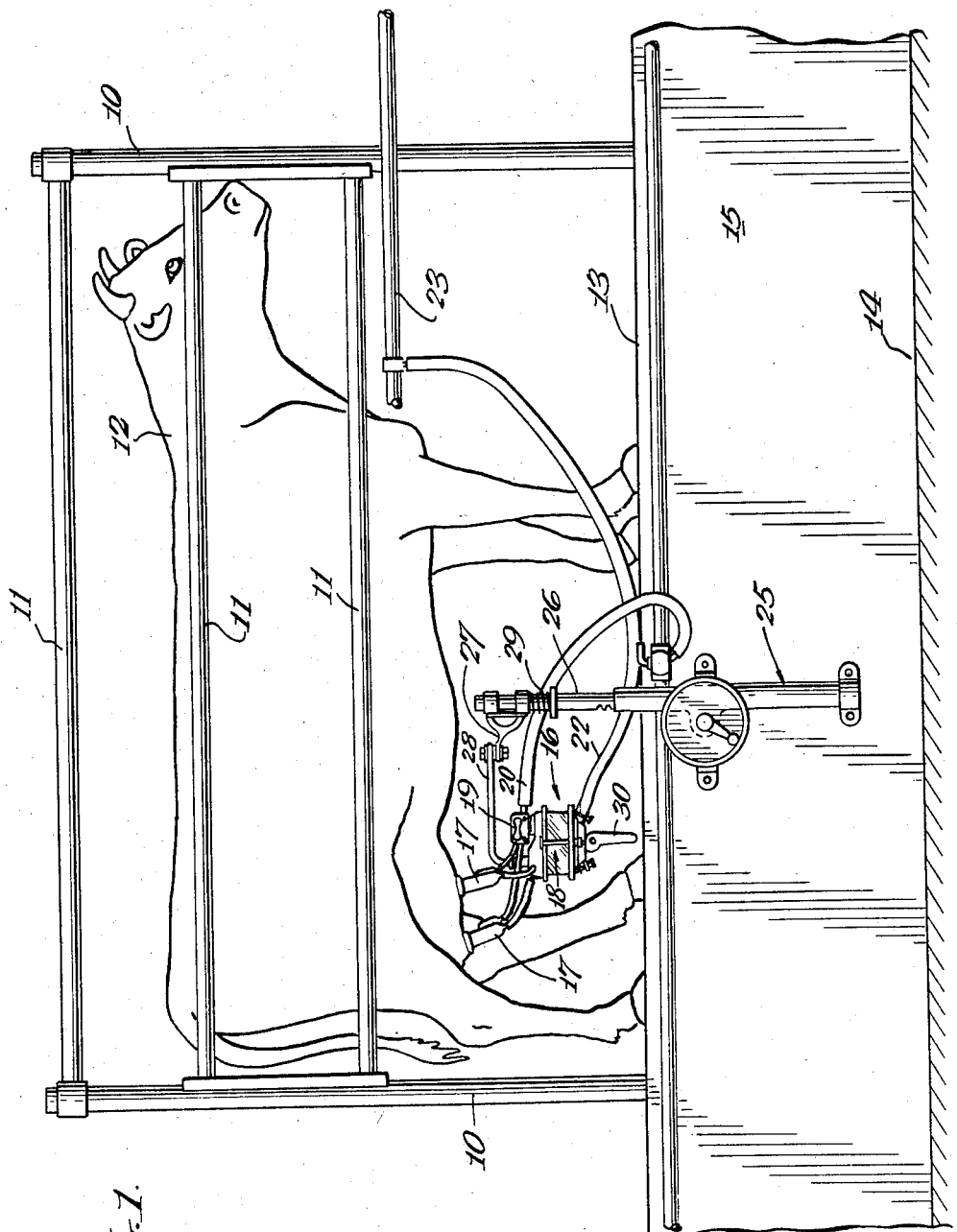

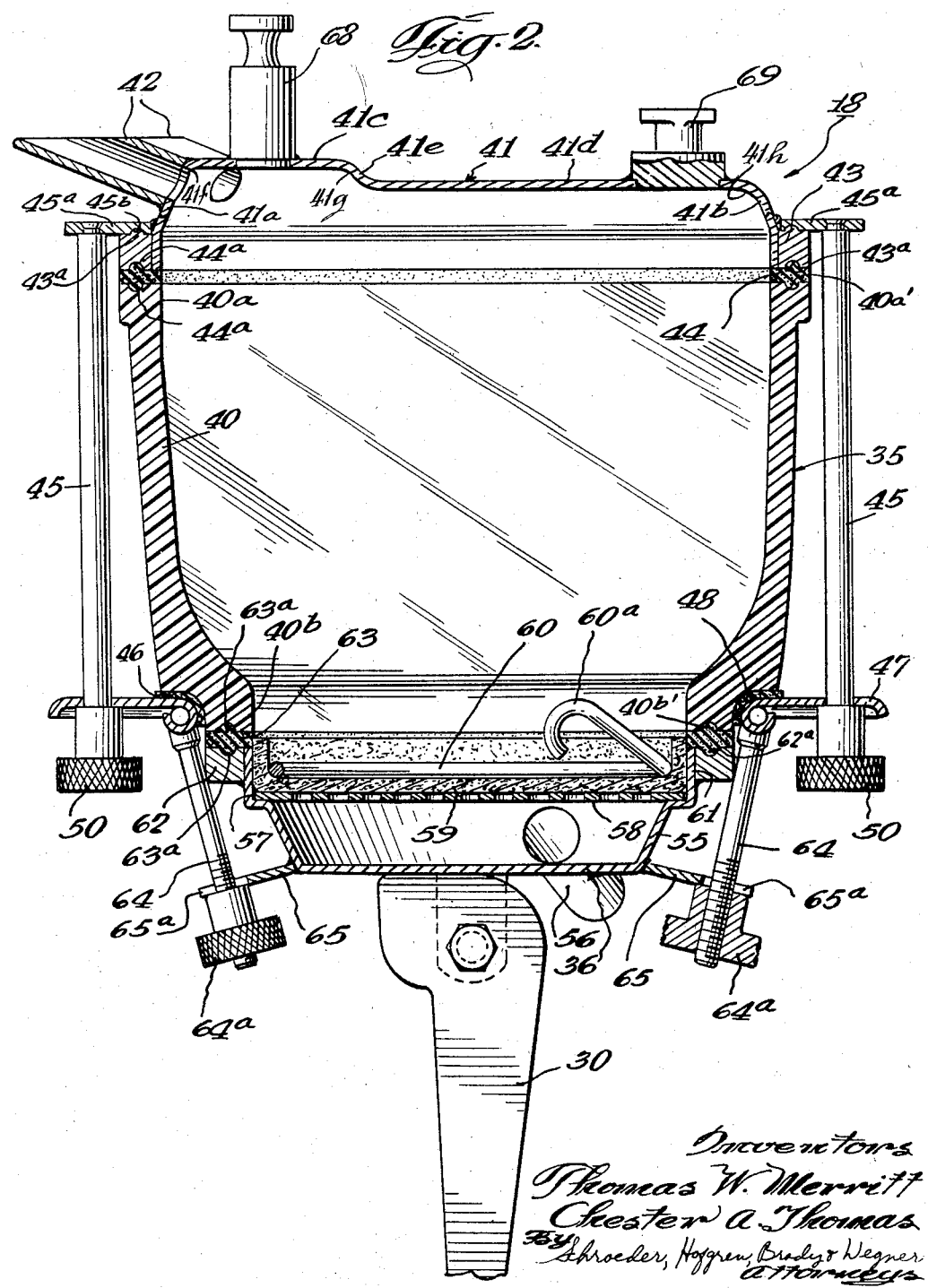

United States Patent Office 2,869,512
Patented Jan. 20, 1959

2,869,512

MILKER

Thomas W. Merritt, St. Charles, and Chester A. Thomas, Lake Forest, Ill., assignors to Babson Bros. Co., a corporation of Illinois Original application June 24, 1955, Serial No. 517,842. Divided and this application December 16, 1957, Serial No. 703,146

7 Claims. (Cl. 119—14.46)

This invention is concerned with milking apparatus and more particularly with milk receiving apparatus for use in carry-away milking systems.

This application is a division of our copending application, Serial No. 517,842, which matured into Patent No. 2,831,456.

The term "carry-away milk system" is generally used to refer to those systems in which milk passes directly from milk withdrawing apparatus attached to an animal into a conduit or pipe line through which it flows, usually under the influence of vacuum and gravity, to a delivery point, which may be common milk cans, a refrigerated tank, pasteurizing apparatus or the like. In some cases a pump is utilized to force the milk on through a portion of the system. Carry-away systems are to be contrasted with bucket milkers in which a milk-receiving bucket is either suspended beneath the animal or positioned on the floor adjacent the animal.

The milk contacted portions of carry-away milking systems, as all other apparatus used in milking, must be washed and sterilized thoroughly following each use; and at the present time the trend is toward the use of "in-place" washing systems for milk carry-away pipe lines and at least part of the associated milk handling apparatus.

It is a principal object of the present invention to provide a new and improved milk receiver for use with carry-away milk handling systems and particularly adapted for in-place washing.

One feature is the provision of a milker lid including an upwardly extending, arcuate forward wall portion, a flat top portion, and a plurality of nipples defining milk passageways and adapted to be connected to the milk tubes of a plurality of teat cup assemblies, secured to and extending from the arcuate portion and adjacent the top portion. Yet a further feature is that the lid has a top including a generally planar forward portion, a generally planar rear portion spaced below the forward portion and a transversely extending inclined portion joining the two planar portions.

Further features and advantages will readily be apparent from the following specification and from the drawings, in which:

Figure 1 is a side elevational view of a cow in a milking parlor, showing milk receiving apparatus of the present invention in use; and Figure 2 is a vertical sectional view of the milk receiving apparatus of Figure 1 taken longitudinally through the upper portion of the lid and transversely through the rest of the apparatus.

Carry-away milk pipe line systems have been known and used for many years, and in the last ten years or so have gained greatly in popularity. This increased use is due at least in part to the trend toward larger dairy herds and the demand for labor-saving devices. With early carry-away milking systems it was necessary that the entire system be disassembled for washing following each milking; i. e., the sections of the pipe line had to be taken down and scrubbed with brushes to insure cleanliness. Recently, systems have been developed with which the milk pipe lines and much of the associated apparatus may be washed without disassembly. Such systems are sometimes referred to as "cleaned-in-place" or "CIP" systems. In these systems, the desired washing solutions, as rinse water, detergent or sanitizing solutions, are circulated through the pipe line and other apparatus by means of vacuum, pumps or a combination of the two.

Prior to the present invention it was necessary that the milk receiving apparatus, such as that shown in Thomas Patents 2,706,965 and 2,709,416, be completely disassembled and washed by hand separately from the rest of the system, in order to insure that it was properly cleaned. This was due largely to the fact that there are cracks and crevices in such prior milk receiving apparatus which are not adequately cleaned by a flow of water through the unit.

Turning now to Figure 1 of the drawings, a milking parlor stall, comprising upright members 10 joined by horizontal members 11 is shown. The cow 12 stands on an elevated floor or cow alley 13 which may be two to three feet above the floor 14 of the operator's alley, the two floors being joined by a vertical wall 15. The single stall structure and aligned arrangement of the cow floor and operator's alley are shown for purposes of simplicity and in practice stalls such as those shown in Babson et al. Patent 2,477,035 or Thomas Patent 2,692,577 might be used.

The milking apparatus, indicated generally as 16, includes four teat cup units 17 secured to milk receiving apparatus 18. A pulsator 19 is mounted on top of the milk receiving apparatus and is connected through a hose 20 to a vacuum line 21. The milk withdrawing apparatus has connected to the bottom thereof a milk hose 22 connected to an evacuated milk carry-away pipe line 23. The milk withdrawing apparatus is carried beneath the animal by supporting mechanism indicated generally as 25 and including a vertically movable post 26 to which is secured an inwardly extending arm 27 which carries at its inner end a rearwardly extending arm 28 to which is connected the milk withdrawing apparatus. A spring 29 urges the first arm 27 forwardly, providing a forward component of pull on the animal's teats, while post 26 is adjusted to provide a downward pull. Further details of the supporting arrangement may be found in Babson Re. 22,368. A leg 30 on the bottom of milk withdrawing apparatus prevents the teat cups from touching the floor should they accidentally become disengaged.

The milk receiver has a capacity sufficient to hold all of the milk delivered from the cow in a single pulsation; as at least a pint and preferably of the order of one or one and a half quarts. This permits the milk to separate from the ends of the milk tubes, preventing milk from washing back around the teats when the inflations expand.

Following the milking operation, the milking system may readily be converted for washing by making suitable connections with a source of washing solution. Details of several washing systems are shown in Merritt application, Serial No. 485,773, filed Feb. 2, 1955, and Thomas application, Serial No. 435,812, filed June 10, 1954, and reference may be had thereto for further information regarding these systems.

Turning now to Figure 2 of the drawings, it will be seen that the milking apparatus indicated generally as 18 includes a bowl unit 35 and a base unit 36. The bowl unit 35 has a bowl 40, of transparent glass material, through which the flow of milk may be observed and having an open top and bottom 40a and 40b respectively. A lid member 41 is provided with a plurality of nipples 42 over which the milk tubes of the teat cup inflations are secured. Extending peripherally along the lower edge of lid member 41 is a bar ring 43 which is welded to a vertically extending portion of the lid. An external shoulder 46 is formed adjacent the open lower end of bowl 40 and adapted to receive an annular clamping ring 47, which is spaced from the bowl 40 by a resilient cushion pad 48, to prevent breakage of the bowl. A resilient gasket 44 is interposed between the bar ring 43 and the open top of bowl 40, and the entire assembly is secured together in liquid-tight engagement by a pair of tie bolts 45. Tie bolts 45 are provided at their upper ends with inwardly extending ears 45a which are riveted to the ends of the bolts and which have formed therein small depressions 45b, adapted to mate with protuberances 43a on the upper surface of bar ring 43. The lower ends of the tie rods extend through openings provided in clamping ring 47 and knurled nuts 50 permit the bowl unit to be dismantled when necessary, as to replace gasket 44.

The base unit 36 of the milk receiving apparatus comprises a cup-shaped base member 55 which has secured thereto a nipple 56 to which is connected the evacuated carry-away milk hose 22. Base member 55 is generally cup-shaped in cross section and is provided with an inwardly directed, internal annular shoulder 57 on which is removably carried an apertured filter supporting plate 58. Carried on the plate 58 is a filter element 59, preferably of a cotton fiber material. The filter member 59 is slightly larger in diameter than the diameter of base member 55 and when properly positioned therein extends upwardly around the peripheral rim 61 of the base member. The filter is securely held in the base member by an annular spring clamp 60, which extends slightly less than all the way around the interior of the base member and urges the filter outwardly against the upstanding rim 61. The spring clamp is provided with upwardly and inwardly directed looped end portions 60a by means of which it may be grasped and removed from the base member permitting removal of the filter.

A bar ring 62 is welded to the outside of the rim portion 61 of base member 55; and a resilient gasket 63 is interposed between bar 62 and the open bottom 40b of the bowl member. A pair of eye bolts 64 are pivotally carried by clamping ring 47 and are movable into longitudinal slots 65a formed in ears 65 secured to the bottom of base member 55. Knurled knobs 64a removably secure base unit 36 to bowl unit 35 and in fluid-tight engagement therewith.

Several features of the milk receiving apparatus 18 particularly adapt it for CIP washing operations, the apparatus being thoroughly cleaned by a flow of washing solution therethrough. This eliminates the necessity for completely disassembling the milk receiving apparatus for washing by hand.

First, gaskets 44 and 63 are what are termed "flush" gaskets. That is, when the various elements of the apparatus are secured together in liquid-tight relationship, the inner surface of the bottom of lid 41, the inner surface of gasket 44 and the inner surface of the open upper portion 40a of the bowl form a smooth unbroken surface, with no crevices in which milk may become lodged. The same relationship holds true for the inner surfaces of base member 55, gasket 63 and the open bottom 40b of the bowl.

In order to accomplish this, the gaskets 44 and 63, which are preferably of a synthetic rubber material, are formed so that in unstressed condition the inner surfaces thereof are slightly concave, whereby when the gasket is compressed, the inner surface forms a straight line joining the inner surfaces of the adjacent members.

Gaskets 44 and 63 are both provided with upstanding annular tongues 44a and 63a respectively, which engage with mating grooves 43a, 40a', 40b' and 62a, in bar ring 43, the top and bottom surfaces of bowl 40 and bar ring 62, respectively, to facilitate proper alignment of the elements of the apparatus during assembly. This insures that the inner surface of the assembled apparatus will be free from crevices in which milk might lodge.

The independent securing means for fastening base member 55 to the bowl unit 35 permits opening of the base unit after milking and before start of the washing operation, without completely disassembling the apparatus. This allows removal of the filter, a necessary step before washing, without the danger of getting milk on most surfaces which are not contacted by the washing solutions when the unit is assembled. If, during the removal of the filter, some milk should accidentally get on the mating surfaces of gasket 63, base member or the bottom of the bowl, it may easily be rinsed off before the elements are reassembled prior to washing.

The lid 41 is provided with an upstanding arcuate portion 41a at the forward edge thereof (the term forward being here used to indicate that portion of the lid which faces toward the rear of the animal being milked, and arcuate being in cross section as seen in Fig. 2) and an arcuate rear portion 41b. The top of the lid includes a planar forward portion 41c joined with the upstanding arcuate portion 41a, and a planar rear portion 41d, joined with arcuate rear portion 41b, but on a plane below portion 41c. The two planar portions 41c and 41d of the top surface of the milker lid are joined along a transverse, inclined portion 41e which extends completely across the lid. Secured to and extending upwardly from the top portion 41c is a post 68 which may be secured to the end of milker support arm 28. Projecting upwardly from the lower level 41d of lid top portion is a pulsator support post 69, which carries pulsator 19. The two level lid provides adequate space on upstanding arcuate portion 41a for the securing thereto of nipples 42 while also providing sufficient clearance between the top of pulsator 19 and support arm 28, permitting adjustment and lubrication of the pulsator without removing it from the apparatus.

Nipples 42 are secured to the arcuate forward portion 41a of the lid so that the bore 42a thereof enters through the lid, tangent to the underside of the top of the lid. (In practice, the nipples are welded to the solid surface of the lid and then the hole is drilled through the lid surface). In many CIP washing systems, a reservoir or tank for washing solution is provided and includes a rack in which the milk withdrawing apparatus is suspended during washing (see aforementioned Merritt application, Serial No. 485,773). These racks are so designed that the milking apparatus is suspended with the forward portion of the lid lowermost and the teat cup assemblies hang down into the washing solution. If the nipples 42 were not secured to the lid as shown and described, with the milk passageways entering the lid on the arcuate forward portion thereof and adjacent the top surface, washing solution might become trapped within the apparatus, and contaminate the milk during the next milking.

All of the inner concave corners of the lid, as at 41f, 41g and 41h have a radius of at least one-quarter inch. This facilitates proper cleaning of the lid by the circulation of the washing solution through the apparatus, eliminating any need for manual scrubbing of small crevices.

While we have shown and described certain embodiments of our invention, it is to be understood that it is capable of many modifications. Changes therefore, in the construction and arrangement may be made without departing from the spirit and scope of the invention as disclosed in the appended claims.

We claim:
1. A lid of the character described for a milker, including: an upwardly extending arcuate forward wall portion; a flat top portion; and a plurality of nipples defining milk passageways adapted to be connected to the milk tubes of a plurality of teat cup assemblies, secured to and extending from said arcuate portion and tangent to said top portion.

2. A lid of the character described for a milker, comprising: an upwardly extending arcuate forward wall portion; a flat top portion having an undersurface; and a plurality of nipples each having a bore defining a milk passageway and adapted to be connected to the milk tubes of teat cup assemblies, said nipples being secured to said forward wall portion and extending upwardly and outwardly therefrom, said forward wall portion having openings therein aligned with the bores of said nipples and tangent to the undersurface of said flat top portion.

3. A lid of the character described for a milker including: an upwardly extending, arcuate forward wall portion; an arcuate rear wall portion; a top including a generally planar forward portion joined with said forward wall, a generally planar rear portion spaced below and parallel with said forward portion and joined with said rear wall, and a transversely extending inclined portion joining said two planar portions; means on the forward portion of said top for connection with a milker support; and means on the rear portion of said top for mounting a pulsator.

4. A lid of the character described for a milker including: an upwardly extending, arcuate forward wall portion; an arcuate rear wall portion of lesser upward extent than said forward wall portion; a top including a generally planar forward portion joined with said forward wall, a generally planar rear portion spaced below and parallel with said forward portion and joined with said rear wall, and a transversely extending inclined portion joining said two planar portions; a first upwardly extending element on the forward portion of said top for connection with a milker support; and a second upwardly extending element on the rear portion of said top for mounting a pulsator.

5. A lid of the character described for a milker, comprising: an upwardly extending arcuate forward wall; an arcuate rear wall; a top including a generally planar forward portion joined with said forward wall, a generally planar rear portion below and parallel with said forward portion joined with said rear wall, and a single transversely extending inclined portion joining said two planar portions; and a plurality of nipples for connection with the milk tubes of teat cup assemblies, the milk passageway defined by said nipples entering said lid adjacent the top surface thereof, and all concave inner corners of said lid having a radius at least of the order of one-quarter inch.

6. A lid of the character described for a milker, comprising: an upwardly extending arcuate forward wall; an arcuate rear wall; a top including a generally planar forward portion joined with said forward wall; a generally planar rear portion below and parallel with said forward portion, joined with said rear wall, and a single transversely extending inclined portion joining said two planar portions; and a plurality of nipples for connection with the milk tubes of teat cup assemblies, the milk passageway defined by said nipples entering said lid adjacent the top surface thereof, the junctures of the forward wall and the forward portion of the top, of the rear wall and the rear portion of the top, and of the forward portion of the top and the transversely extending inclined portion thereof each having a radius at least of the order of one-quarter inch.

7. A lid of the character described for a milker including: an upwardly extending arcuate forward wall portion; an arcuate rear wall portion; a top including a generally planar forward portion joined with said forward wall, a generally planar rear portion spaced below and parallel with said forward portion and joined with said rear wall, and a transversely extending inclined portion joining said two planar portions; and a bar ring secured to the lower portion of the outside of the forward and rear wall portions for mating engagement with a sealing gasket.

References Cited in the file of this patent

UNITED STATES PATENTS 2,735,399    Henrard _____ Feb. 21, 1956

FOREIGN PATENTS 628,600    Great Britain _____ Sept. 1, 1949